Dec. 18, 1962  J. F. JOHNSON  3,068,730
APPARATUS FOR SLITTING TUBULAR SHEET MATERIALS
Filed May 4, 1960  3 Sheets-Sheet 2

JOHN F. JOHNSON
*INVENTOR.*

BY E. J. Berry

United States Patent Office 3,068,730
Patented Dec. 18, 1962

3,068,730
APPARATUS FOR SLITTING TUBULAR SHEET MATERIALS
John F. Johnson, Shortsville, N.Y., assignor to National Distillers and Chemical Corporation, New York, N.Y., a corporation of Virginia
Filed May 4, 1960, Ser. No. 26,737
4 Claims. (Cl. 83—184)

The present invention relates to an apparatus for slitting tubular film webs such as produced by blown-tube extrusion of thermoplastic materials. The invention particularly relates to such apparatus wherein the tubular film web is first flattened to provide a layered web, wherein the edge portions are integrally joined, and then slit along the opposite, joined edge portions to form two separate film web layers.

In the manufacture of thermoplastic films particularly, two conventionally accepted production systems are employed. In the one, the thermoplastic film is extruded as a flat sheet. By this system extremely wide sheets may be produced, but normally with some sacrifice of brilliance and clarity. Also, difficulty is frequently experienced in the production of very thin films such as in the gauge range of from about .005 to about 10 mils. In the other system, the film is extruded in tubular form, being expanded by air pressure internally as it leaves the extrusion die. This system is known as blown tubular film extrusion. It produces a film having considerable clarity and brilliance, and can be employed to produce film of exceeding thinness as compared with those produced by the flat sheet system.

Where thin films, having characteristics of clarity and brilliance, are required, it is customary to employ the blown tubular film process, slitting the formed tube to obtain a flat sheet. While the slitting operation has been practiced with some success, difficulties are experienced in maintaining straight parallel edges in the finished product.

It is an object of the present invention to provide an apparatus adapted to slit a flattened blown tubular film along either one or both longitudinal edge portions of the layered web. It is also an object of the invention to provide an apparatus capable of functioning in such manner, wherein the cut edges produced are substantially straight and parallel. It is also an object of the invention to provide a slitter apparatus which adjusts itself to accommodate for ordinary variation in lateral dimension of the flattened tubular sheet as passed over the slitter means.

The invention and its objects may be more fully understood from the following description when it is read with reference to the accompanying drawings, in which.

Figure 1:
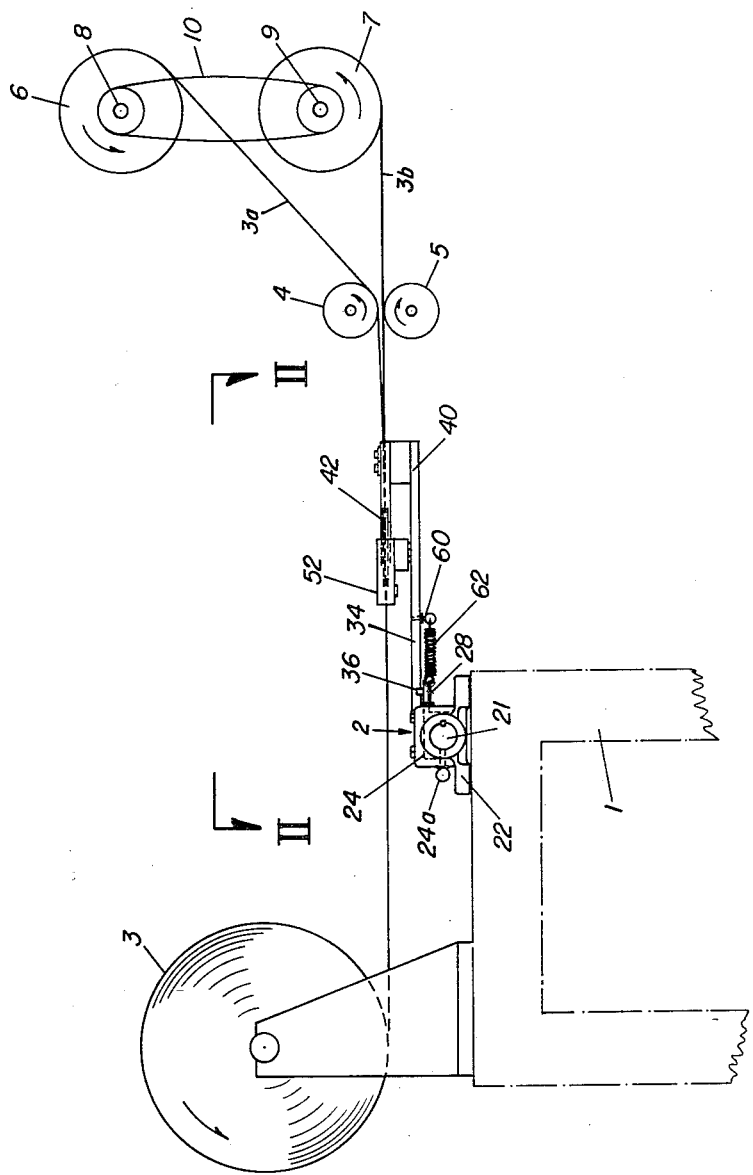
FIG. 1 is a diagrammatic showing of the slitter apparatus in combination with related, and relatively conventional operating units.

In the drawings, the numeral 1 designates a frame work adapted to support the slitter assembly 2, and in the arrangement contemplated, a roll of lay-flat tubular film 3. The numerals 4 and 5 designate a pair of idler rolls adapted to maintain the cut film layers, 3a and 3b, substantially aligned in the direction of film travel over the slitter knives. The numerals 6 and 7 designate a pair of wind-up rolls, driven by means not shown, but interconnected as by sprockets 8 and 9 and sprocket chain 10 to provide uniform withdrawal of the tube from the supply source, provided in the drawing by the roll 3.

Figure 2:
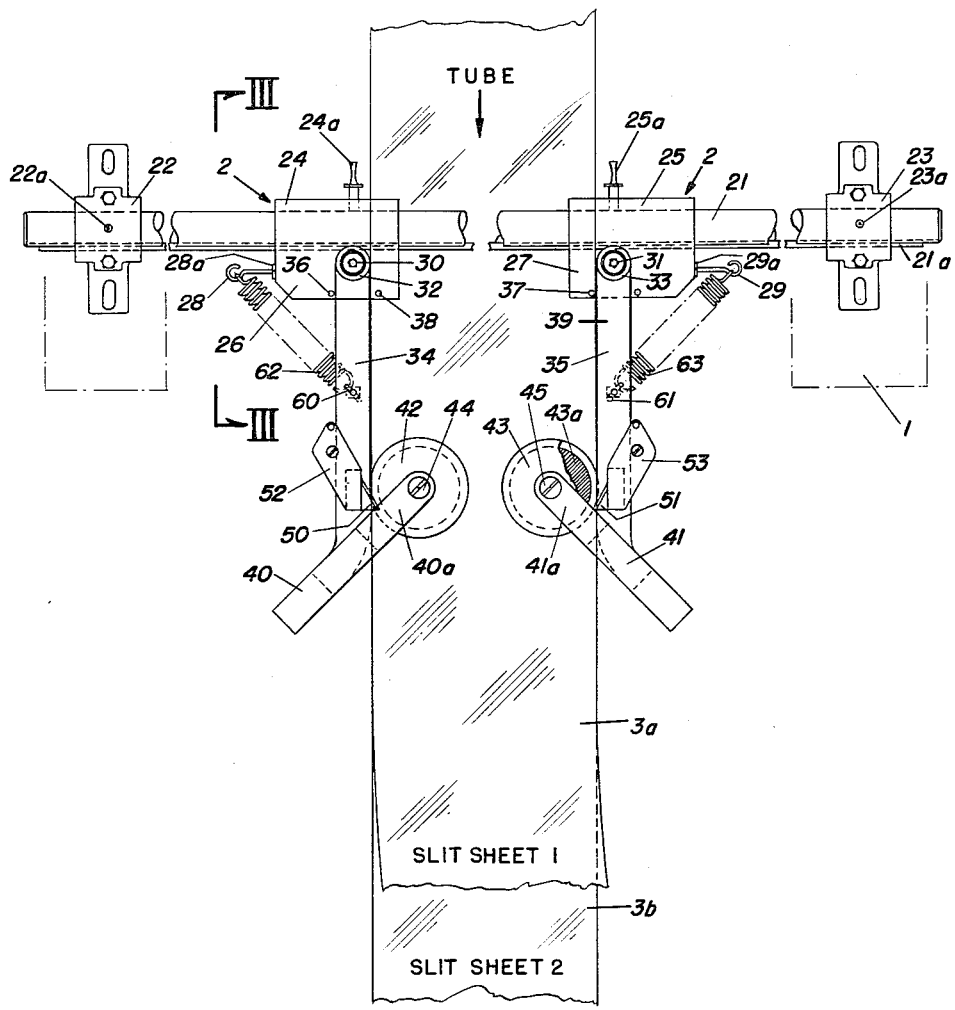
FIG. 2 is a plan view of the slitter assembly apparatus taken along the line II—II of FIG. 1.

In FIG. 2, the slitter assembly 2 is shown in greater detail. A support shaft 21 is disposed in laterally parallel relation to the frame 1 by means such as pillow block bearing members 22 and 23. To support the shaft in predetermined fixed relation to the pillow block members, a spline 21a is adapted for engagement in suitable grooves defined in the block members. The spline 21a is provided to extend for substantially the entire length of the shaft 21, whereby to fix the shaft against rotation. In addition, means such as the set screws 22a and 23a also are provided in the respective pillow block members to fix the shaft against movement along its longitudinal axis.

Figure 3:
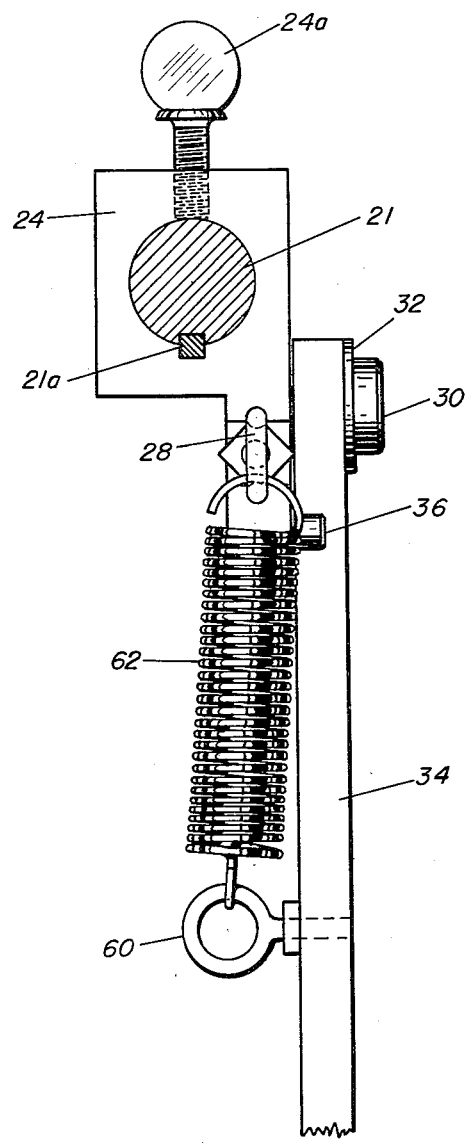
FIG. 3 is an enlarged view in side elevation along the line III—III of FIG. 2.

Carried by the shaft 21, are a pair of mounting blocks 24 and 25. Each mounting block, as more particularly shown in FIGS. 2 and 3, includes a four sided body portion having a bore extended laterally thereof, which is adapted to be received over the shaft, including the spline 21a. The spline 21a prevents rotation of the mounting blocks by engagement in a corresponding recess opening radially from each block bore. The blocks 24 and 25 also respectively include radially extended flattened flange portions 26 and 27. The respective upper and lower surfaces of each flange portion are disposed in substantially parallel relation to the side walls of the recess in the bore of the mounting block body of which the flange is an integral part. Thus, when the mounting blocks are properly engaged with the shaft 21, the flange portions 26 and 27 also extend in the direction of film travel. Thumb screws 24a and 25a, adapted to be threaded through bores in the respective blocks 24 and 25 into engagement with the shaft 21, prevent movement of the blocks longitudinally of the shaft.

The outboard side of each mounting block is drilled and the drilled bore tapped to receive the threaded end of an eyebolt, such as indicated by the numerals 28 and 29. When threaded into the tapped bores, these eyebolts are retained against movement by means such as lock units 28a and 29a.

The upper surface of each mounting block flange portion, 26 and 27 respectively is drilled and tapped to receive shoulder bolts 30 and 31 respectively. These bolts, in conjunction with flat washers 32 and 33, are adapted to provide a pivotal mount for a pair of slitter arms 34 and 35 respectively extended therefrom in the direction of film travel past the mounting blocks. A pair of spaced dowel pins aligned with the trailing edge portion of each mounting block provide limit stops for arcuate pivoted movement of each slitter arm. In the drawings, these dowel pins are designated in pairs by the numerals 36 and 38, and 37 and 39.

The slitter arms 34 and 35 are of mirror opposite construction. Each arm provides a cross-head piece, respectively designated by the numerals 40 and 41, integral with the free ends of the respective arms 34 and 35. Each head piece is disposed angularly with reference to its related slitter arm to provide a head piece portion adapted to form an acute angle with the slitter arm which opens in the general direction of the support shaft when the arm is mounted on a mount-block flange. The respective angular head piece portions are designated respectively by the numerals 40a and 41a. In mounting the slitter arms, these portions 40a and 41a are disposed in opposed relation, so as to extend toward the center line of the film travel plane from the inboard sides of the respective arms.

The outer end of each head piece portion preferably is bifurcate in form, whereby to provide a bearing mount for a slitter wheel. In the drawings, slitter wheels 42 and 43 are shown mounted in the respective bifurcate portions 40a and 41a, as by means of axle members 44 and 45 extended between the ends of the opposite legs of the respective bifurcate portions 40a and 41a.

Each slitter wheel provides an edge portion defining a circumferential recess, such as indicated by the numeral 43a in FIG. 2, which is adapted to receive the end edge portion of a slitter knife held in a clamp mounted on the adjoining slitter arm. In the drawings, the slitter knives are designated by the numerals 50 and 51, and their respective clamps by the numerals 52 and 53. Preferably the clamps 52 and 53 are disposed so as to extend the slitter knives angularly through and beyond a plane extending through the axis of each slitter wheel in perpendicular relation to the respective slitter arms, and in such relation to the walls of the slitter wheel circumferential recess as to provide a sliding surface contact between a recess wall portion and the corresponding knife edge. The angular disposition of each knife is such that the knife edge forms an acute angle with the circumferential edge of the slitter wheel, which angle opens in a direction opposite to the direction of travel of a film web to be processed.

At a point on each slitter arm, intermediate the knife clamp thereon, and the pivotal mount therefor, a swivel eye is secured to the under surface of the arm in laterally displaced relation to the inboard edge of the arm. The respective eyes are designated in the drawings by the numerals 60 and 61. Tension spring members 62 and 63 are connected respectively between the swivel eye 60 and the eye of bolt 28, and between the swivel eye 61 and the eye of bolt 29, whereby the arms 34 and 35 are biased in an outboard direction, one away from the other.

In operation, a flattened tubular web of the material to be processed is drawn over the frame 1 from a supply source such as a roll of the material, or from a continuous production source. The tubular web, further, is drawn over the support shaft 21 for slightly more than the distance between the shaft and the slitter wheel axles 44 and 45.

At this point, the slitter wheels are inserted in the open end of the tube and released therein to engage the inner surface of the tube substantially along the longitudinal edge fold lines thereof. Either under pressure exerted by the tension springs 62 and 63 or with manual assistance, the knives 50 and 51 are caused to penetrate the web edges as the web is drawn over the slitter wheels. The tension springs tending to draw the slitter wheels outwardly, maintain the web in laterally taut condition. This tension spring action also provides accommodation for ordinary variation of a tube diameter as produced by conventional methods.

With the slitting operation started, the respective layered cut sheets 3a and 3b are led together between the idler rolls 4 and 5. Thence the upper sheet is secured on the roller 6, while the lower sheet is secured on the roller 7. At this point, the drive for the rollers 6 and 7 may be activated whereby mechanically to draw the tubular web over the slitter knives and wheels, and to wind the cut sheets on the respective rollers.

In the event that it is desired to produce a single sheet from a tubular web, one of the knives 50 or 51 may be removed from engagement in the corresponding slitter wheel recess. The slitter wheels continue to coact, however, to maintain lateral tautness in the web. In place of the two rollers 6 and 7, a single roller of greater width to accommodate the wider sheet produced is provided. In addition, as the single cut sheet is drawn between the idler rollers 4 and 5 it will be passed over any desired means conventionally provided to open a cut sheet of the character contemplated. Alternately, one of the slitter wheel assemblies, such as mounted on the block 24, may be removed from the travel plane of the web 3. In this method of operation, the cut web is aligned, and the superposed sheet layers held in maintained registration by pressure applied to the idler rollers 4 and 5 in any fashion familiar to those skilled in the art.

What is claimed is:

1. Apparatus for slitting sheets of material produced in flattened tubular form, said apparatus including frame support structure, a shaft mounted transversely of said frame structure, spaced mounting means adjustably supported upon said shaft and selectively movable toward and away from each other, means for retaining said spaced mounting means in adjusted position having relationship to the width of the tubular material to be slit, a slitter arm pivotally attached to each mounting means and extending therefrom away from said frame structure in the direction of travel of sheet material to be slit, each slitter arm terminating at its free extremity in an angularly disposed cross head forming an acute angle therewith opening in the direction of the supporting shaft, a slitter wheel mounted adjacent the inner extremity of each cross head for rotative movement, each slitter wheel being provided with a continuous peripheral recess, a slitter knife supported upon at least one of said slitter arms and having a cutting edge projecting inwardly therefrom and extending angularly into the peripheral recess of the associated slitter wheel in the direction of travel of tubular material to be slit, said slitter wheels being adapted for insertion within said tubular sheet to spread the same and present opposed longitudinal edges thereof in advance of the related slitter knife, and means for biasing each slitter arm outwardly from a line midway between their respective points of pivotal support.

2. Apparatus as set forth in claim 1 wherein a slitter knife is mounted upon each of said slitter arms, each such slitter knife and mounting means extending angularly across the slitter arm in a direction substantially perpendicular to the associated cross head whereby the cutting edge forms an acute angle to the edge of the slitting wheel, said angle opening in a direction opposite to the direction of travel of the material being slit.

3. Apparatus for slitting sheets of material produced in flattened tubular form, said apparatus including frame support structure, a shaft mounted transversely of said frame structure, a pair of mounting blocks adjustably supported upon said shaft and selectively movable toward and away from each other, means for retaining said mounting blocks in adjusted position having relationship to the width of the tubular material to be slit, a slitter arm pivotally attached to each mounting block and extending horizontally therefrom away from said frame structure in the direction of travel of sheet material to be slit, each slitter arm terminating at its free extremity in an angularly disposed cross head forming an acute angle therewith opening in the direction of the supporting shaft, a slitter wheel mounted adjacent the inner extremity of each cross head for rotative movement, each slitter wheel being provided with a continuous peripheral recess, a slitter knife supported upon at least one of said slitter arms and having a cutting edge projecting inwardly therefrom and extending angularly into the peripheral recess of the associated slitter wheel in the direction of travel of tubular material to be slit, said slitter wheels being adapted for insertion within said tubular sheet to spread the same in a horizontal direction and present opposed longitudinal edges thereof in advance of the related slitter knife; and means for biasing each slitter arm outwardly from a line midway between their respective points of pivotal support.

4. Apparatus as set forth in claim 3 wherein a slitter knife is mounted upon each of said slitter arms, each such slitter knife and mounting means extending angularly across the slitter arm in a direction substantially perpendicular to the associated cross head whereby the cutting edge forms an acute angle to the edge of the slitting wheel, said angle opening in a direction opposite to the direction of travel of the material being slit.

References Cited in the file of this patent

UNITED STATES PATENTS

| | | |
|---|---|---|
| 1,996,176 | Smith | Apr. 2, 1935 |
| 2,154,371 | Alderfer | Apr. 11, 1939 |
| 2,566,639 | Shreve | Sept. 4, 1951 |
| 2,923,194 | Ambler | Feb. 2, 1960 |

FOREIGN PATENTS

| | | |
|---|---|---|
| 258,424 | Germany | Apr. 5, 1913 |